United States Patent
Wobben

(10) Patent No.: US 6,833,633 B2
(45) Date of Patent: Dec. 21, 2004

(54) LIGHTWEIGHT NON-RESONANT STATOR SUPPORT

(76) Inventor: Aloys Wobben, Argestrasse 19, Aurich (DE), D-26607

( * ) Notice: Subject to any disclaimer, the term of this patent is extended or adjusted under 35 U.S.C. 154(b) by 0 days.

(21) Appl. No.: 10/332,764

(22) PCT Filed: May 23, 2001

(86) PCT No.: PCT/EP01/05912

§ 371 (c)(1),
(2), (4) Date: May 16, 2003

(87) PCT Pub. No.: WO02/05408

PCT Pub. Date: Jan. 17, 2002

(65) Prior Publication Data

US 2004/0101398 A1 May 27, 2004

(30) Foreign Application Priority Data

Jul. 10, 2000 (DE) .......................... 100 33 233

(51) Int. Cl.⁷ ............... F03D 9/00; H02P 9/04
(52) U.S. Cl. .......................... 290/55; 290/44
(58) Field of Search ............... 290/55, 49, 44, 290/15

(56) References Cited

U.S. PATENT DOCUMENTS

| | | | | |
|---|---|---|---|---|
| 1,233,232 A | * | 7/1917 | Heyroth | 290/55 |
| 1,944,239 A | * | 1/1934 | Honnef | 290/55 |
| 2,754,441 A | | 7/1956 | Morgan | 310/258 |
| 3,876,925 A | * | 4/1975 | Stoeckert | 322/1 |
| 4,060,744 A | | 11/1977 | Starčvi″ | 310/91 |
| 4,258,280 A | | 3/1981 | Starcevic | 310/157 |
| 4,289,970 A | * | 9/1981 | Deibert | 290/44 |
| 4,367,413 A | * | 1/1983 | Nair | 290/52 |
| 4,720,640 A | * | 1/1988 | Anderson et al. | 290/43 |
| 5,282,719 A | * | 2/1994 | McCarty et al. | 416/1 |
| 5,783,894 A | * | 7/1998 | Wither | 310/266 |
| 5,844,341 A | | 12/1998 | Spooner et al. | 310/112 |
| 6,064,123 A | * | 5/2000 | Gislason | 290/55 |
| 6,147,415 A | * | 11/2000 | Fukada | 290/55 |
| 6,452,287 B1 | * | 9/2002 | Looker | 290/55 |
| 6,700,216 B1 | * | 3/2004 | Vann | 290/44 |
| 2003/0137149 A1 | * | 7/2003 | Northrup et al. | 290/44 |
| 2003/0193198 A1 | * | 10/2003 | Wobben | 290/54 |

FOREIGN PATENT DOCUMENTS

EP 0 744 313 A2 11/1996

* cited by examiner

Primary Examiner—Nicholas Ponomarenko
Assistant Examiner—Heba Elkassabgi
(74) Attorney, Agent, or Firm—Seed IP Law Group PLLC

(57) ABSTRACT

The present invention relates to a wind turbine having a generator with stator and rotor in a machine housing that is disposed at the top of the wind turbine tower, wherein the stator has a support construction comprising a plurality of support arms. The generator of the wind turbine is a ring generator.

15 Claims, 3 Drawing Sheets

LIGHTWEIGHT NON-RESONANT STATOR SUPPORT

TECHNICAL FIELD

The present invention relates to a wind turbine having a generator with stator and rotor in a machine housing that is disposed at the top of the wind turbine tower, wherein the stator has a support construction comprising a plurality of support arms. The generator of the wind turbine is a ring generator.

BACKGROUND OF THE INVENTION

Wind turbines are known and are already used in large numbers. The development of wind turbines is tending towards greater generator output. This trend is often accompanied by an increase in the dimensions of the separate components (especially their support arms) and hence their mass.

Today's prior art, as shown in FIG. 1, has a wind turbine 1 whose nacelle 2 weight (machine housing weight) is in the order of 90–100 tons. Part of this weight is that of the stator support 12 to which the stator 20 of the generator is mounted. Such prior art includes blades 3 coupled to a rotor 4. The rotor 4 has connected thereto an electrical rotor system 5 for generating electricity in interaction with the stator 20 in a manner well known in the art. The wind turbine is thus composed of a relatively large mass. However, such large masses are difficult to handle and generate considerable stress on both the tower and the tower foundations, leading not only to increased material stress, but also to greater costs for the separate, aforementioned components of a wind turbine. Reference is made by way of illustration to the fact that the nacelles (that is, the machine housing) of the wind turbine are not only transported to the building site, but in many cases must be hoisted in their separate parts to the top of the tower.

Another problem encountered with wind turbines relating above all, in addition to building law issues, to the acceptance of such turbines among the respective neighborhood, is that of noise emission, in that the noise emissions produced even by modern wind turbines constitute a disturbance and can therefore reduce the acceptance of such turbines.

Part of the noise emissions are generated by the support arms, since these have a hollow interior and sealed outer surfaces, with the result that a resonant body is formed.

SUMMARY OF THE INVENTION

One object of the present invention is therefore to specify a wind turbine whose components have reduced weight and whose noise emissions are lowered.

This object is achieved in accordance with the invention by the stator support having an open structure. This open structure results in reduced weight, on the one hand, as well as less material being used, on the other. Noise emissions are also reduced, because by virtue of their open structure the support arms can no longer form a resonant body, thus eliminating the noise emission of the support arms, at least.

Due to its lower weight compared to previous designs, a stator support according to the invention thus helps to reduce the mass of the nacelle, and hence to improve handling and transportability of the components and/or the entire nacelle.

Other preferred embodiments are characterized by the subclaims.

BRIEF DESCRIPTION OF THE DRAWINGS

One embodiment shall now be described in detail with reference to the figures. These show.

DETAILED DESCRIPTION OF THE INVENTION

Figure 1:
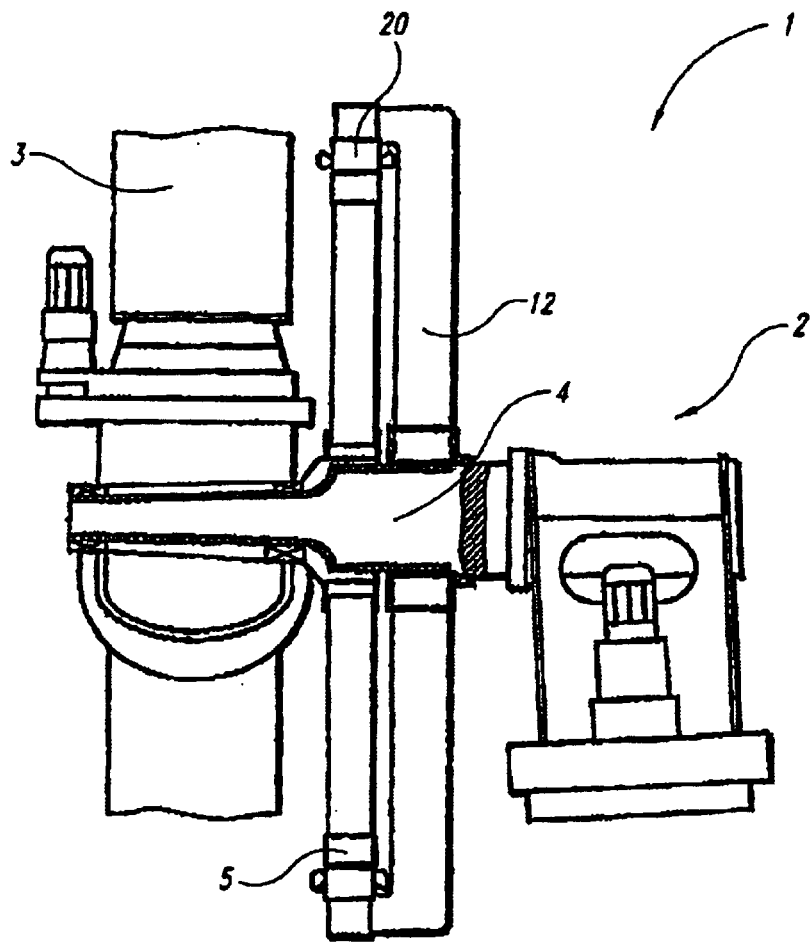
FIG. 1 shows the nacelle portion of a wind turbine 1 according to the prior art.
Figure 2:
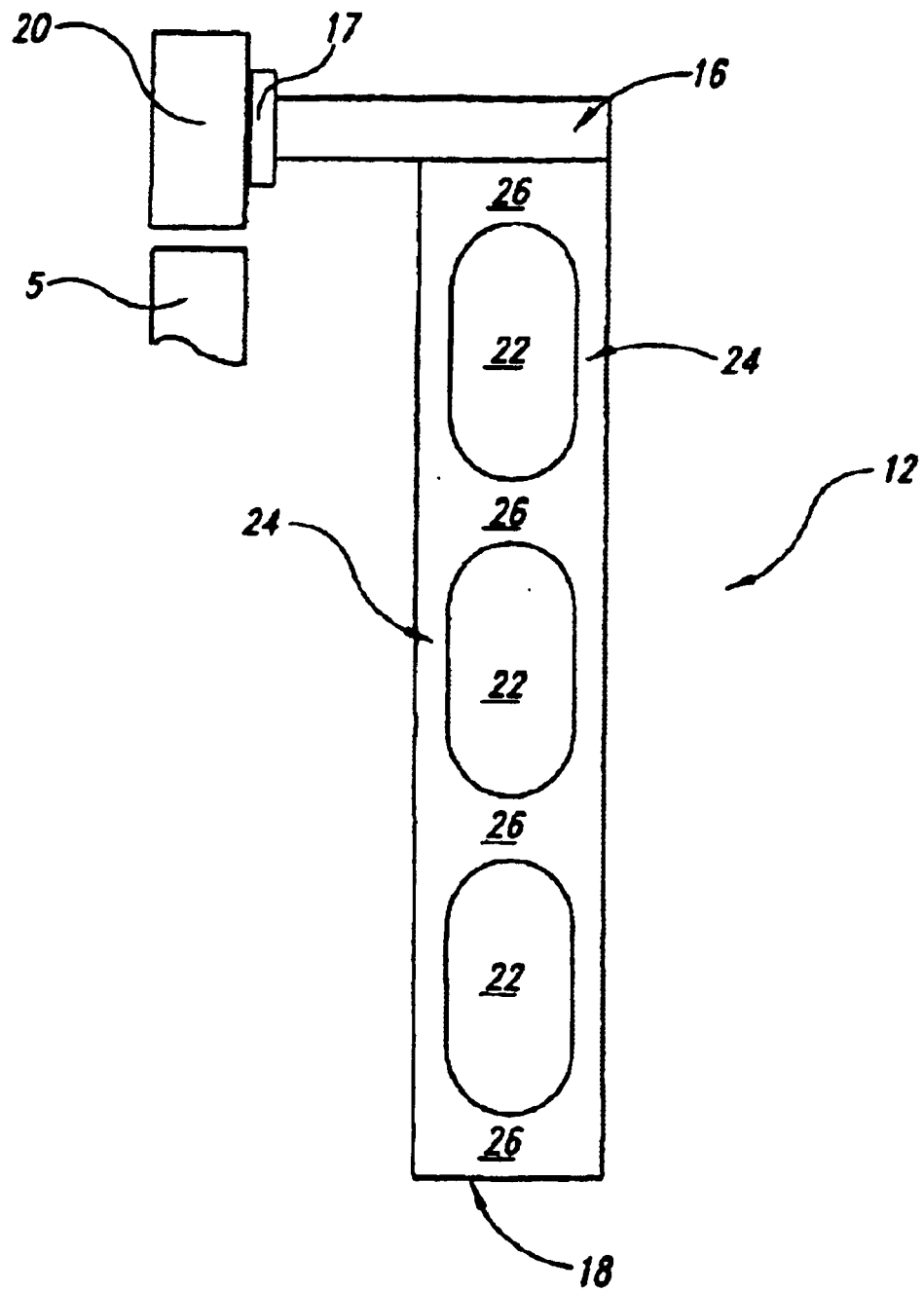
FIG. 2 is a side elevation view of a support arm according to the invention.

The support arm 12 shown in a side elevation view in FIG. 2 has an open structure, with the result that it does not form a resonant body. Ascending from a base 18 of support arm, a plurality of holes 22 can be seen in support arm 12, such that the structure of the support arm is formed by lateral bars 24 and traverse struts (traverses) 26 therebetween. Hence, support arm 12 does not constitute a resonant body and cannot, therefore, emit noise.

The support arm 12 pursuant to the invention extends from base 18 along a predefined stretch that ensues from the size of the stator 20 attached to said support arm 12. At the end of the support arm 12 opposite base 18, a perpendicular displacement member 16 extends perpendicularly to support arm 12 and has a support plate 17 at the end of said perpendicular displacement member 16. A stator 20 is mounted on said support plate 17. Stator windings 28 are inside the stator 20. A rotor portion 5 is adjacent the stator. The support plate 17 may have a larger area than the cross-sectional area of a perpendicular displacement member 16.

In the embodiment of support arm 12 according to the invention as shown in FIG. 2, the depth (i.e., the horizontal extension in the figure) is constant. Alternatively, however, said depth can vary and thus permit a change in the cross-section of the support arm 12 of the invention.

Figure 3:
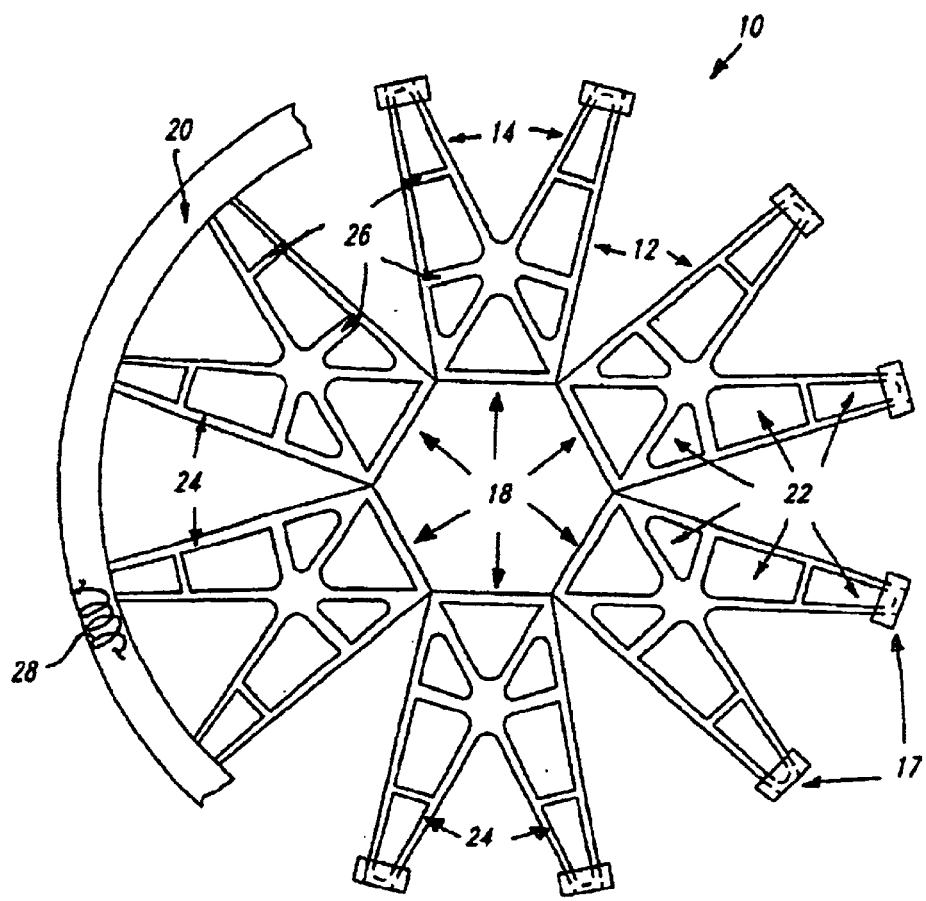
FIG. 3 is a front view of a stator support according to the invention, with a plurality of support arms.

FIG. 3 shows a plan view of a stator support 10 comprised of a plurality of support arms 12 pursuant to the invention. In the figure, one can well see the open, lattice-like structure of support arms 12 formed by bars 24 and traverse members 26.

Support arms 12 thus have an open structure and form, with their inwardly oriented bases 18, an opening through which a rotor axis (a rotor spigot) can extend. Support arms 12 can be used as single elements in that regard. Alternatively, support arms 12 can be joined together, for example at their bases 18, to form an integral stator support 10 or a plurality of stator support segments, which for their part can be deployed singly, or joined together to form an integral stator support 10.

The radially and outwardly directed end of each support arm 12 is divided into two extension arms 14. The outer, perpendicularly angled member 16 of each extension arm 14 runs axially parallel to the direction of the rotor axis. The area of the support plate 17 to which the stator is attached is greater than the cross-sectional area of beam member 16.

The cross-section of extension arm 14 decreases in size from base 18 of the arm to its outer end, namely as it extends outward to the perpendicular member 16. In the case of a support arm 12 as present in the embodiment shown here, this change in cross-section results, given that the depth (i.e., the horizontal extension of the support arms 12 in FIG. 2) remains constant, from the decreasing width (horizontal extension of the support arms 12 in FIG. 3), especially in extension arm 14. Alternatively, the depth and width of support arm 12 and member 16 according to the invention may vary.

In order to illustrate application of the invention, a portion of stator 20 is shown in its installed state, by way of example. Stator 20 extends in a ring shape over the entire outer periphery of the stator support 10 and is distanced from said stator support by the amount that support plate 17 is distanced from the extension arm 14 by member 16. Substantial weight is therefore saved.

In one embodiment of the invention, support arms 12 are attached either singly, as segments or as an integral stator support 10 to a sub-construction which for its part is firmly attached to the machine house.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus, comprising:

a ring generator having a stator and a rotor;

a support construction having a stator ring and one or more stator windings, the support construction formed by a plurality of support arms, each support arm supporting the stator and having a plurality of bars and assembled from said plurality of bars; and one or more support plates, each support elate attached to an end of one of the plurality of support arms and to the stator, the stator being mounted to the support plate in such a-way that the stator is axially displaced from the support construction.

2. The apparatus according to claim 1, further including:

a wind turbine coupled to the rotor to cause rotation of the rotor under wind power.

3. The wind turbine according to claim 2, characterized in that at least one support arm of the stator support is divided into at least two extension arms.

4. The wind turbine according to claim 2, characterized in that an outer portion of each of one or more extension arms runs at a predefined angle to each of one or more extension arms.

5. The wind turbine according to claim 2, characterized in that the cross-section of at least one support arm, or an extension arm of a support arm, decreases towards the end away from a base of said support arm.

6. The wind turbine according to claim 2, further comprising:

a perpendicular displacement member, having an end connected to the support arm or an extension arm of the support arm; and a plate attached at an end of the perpendicular displacement member away from the support arm or an extension arm of the support arm, the area of said plate being greater than the cross-sectional area of the perpendicular displacement member at the point of attachment to the plate.

7. The wind turbine according to claim 2, characterized in that the support arms are installed as single segments and cooperate in situ as a stator support.

8. The apparatus according to claim 1, characterized in that at least two support arms are joined together to form segments, wherein said segments cooperate in situ as a stator support.

9. The apparatus according to claim 1, characterized in that the support arms are joined together to form an integral stator support.

10. A stator support construction apparatus, comprising:

a stator;

one or more stator windings;

a plurality of support arms, each support arm supporting the stator and having a plurality of bars and assembled from said plurality of bars; and one or more support plates, each support plate attached to an end of one of the plurality of support arms and to the stator, the stator being mounted to the support plate wherein the stator is axially displaced from the support construction.

11. The stator support construction apparatus according to claim 10, wherein at least one support arm is divided into a plurality of extension arms.

12. The stator support construction apparatus according to claim 11, wherein the outer portion of at least one extension arm runs at a predefined angle to at least one other extension arm.

13. The stator support construction apparatus according to claim 10, wherein the cross-sectional width of at least one support arm, or an extension arm of a support arm, decreases towards the end away from a base of the support arm.

14. The stator support construction apparatus according to claim 13, further comprising:

a perpendicular displacement member, having an end connected to the support arm or an extension arm of the support arm; and a plate is attached at an end of the perpendicular displacement member away from the support arm or an extension arm of the support arm, the area of the plate being greater than the cross-sectional area of the perpendicular displacement member at the point of attachment to the plate.

15. A stator support construction apparatus, comprising:

a stator;

one or more stator windings;

a plurality of support arms, each support arm supporting the stator and having a plurality of bars and assembled from said plurality of bars wherein the cross-sectional width of at least one support arm decreases towards the end away from a base of the support arm;

a perpendicular displacement member, having an end connected to the support arm or an extension arm of the support arm; and one or more support plates, each support plate being attached at an end of the perpendicular displacement member away from the support arm, the area of the plate being greater than the cross-sectional area of the perpendicular displacement member at the point of attachment to the plate wherein the stator is axially displaced from the support construction.

* * * * *